US009549330B2

(12) United States Patent
Gu et al.

(10) Patent No.: US 9,549,330 B2
(45) Date of Patent: Jan. 17, 2017

(54) SERVICE QUALITY MEASUREMENT AND INDICATION FOR MULTICAST BROADCAST IN A WIRELESS NETWORK (71) Applicants: Verizon Patent and Licensing, Inc, Arlington, VA (US); Cellco Partnership, Arlington, VA (US)

(72) Inventors: John Gu, Rockaway, NJ (US); Sergio Aguirre, Southlake, TX (US); Danny Chick-Leung Lui, Belle Mead, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 184 days.

(21) Appl. No.: 14/030,706

(22) Filed: Sep. 18, 2013

(65) Prior Publication Data
US 2015/0078175 A1 Mar. 19, 2015

(51) Int. Cl.
*H04L 1/00* (2006.01)
*H04W 24/08* (2009.01)

(52) U.S. Cl.
CPC .......... *H04W 24/08* (2013.01); *H04L 1/0009* (2013.01)

(58) Field of Classification Search
CPC ........ H04L 1/004; H04L 1/0078; H04L 1/203; H04L 1/048; H04L 12/2644; H04L 12/2647; H04L 12/2655; H04L 43/0823; H04L 43/0835; H04L 49/555
See application file for complete search history.

(56) References Cited

U.S. PATENT DOCUMENTS

| 6,314,535 | B1 * | 11/2001 | Morris | H03M 13/03 370/468 |
|---|---|---|---|---|
| 2004/0203698 | A1 * | 10/2004 | Comp | 455/421 |
| 2005/0246417 | A1 * | 11/2005 | Raith et al. | 709/203 |
| 2011/0059768 | A1 * | 3/2011 | Pandruvada | H04W 88/06 455/552.1 |
| 2012/0188907 | A1 * | 7/2012 | Dayal | H04W 72/1215 370/254 |

OTHER PUBLICATIONS

Qualcomm Corporation, "eMBMS Signal Indication Proposal" Ver. 1.1, pp. 1-6, Aug. 24, 2012.
Verizon Wireless, "Device Requirements—LTE Data Devices", Ver. 22, pp. 1-87, Jun. 2013.
Verizon Wireless, "Device Feature Definitions / Requirements", Ver. 43, pp. 1-199, Jul. 2012.
M. Watson et. al.; Internet Engineering Task Force (IETF), Request for Comments: 6363; "Forward Error Correction (FEC) Framework;" pp. 1-43; Oct. 2011.

* cited by examiner

Primary Examiner — Alvin Zhu (57) ABSTRACT

A service quality metric, that measures the quality of a multicast broadcast that is being received by a mobile device, may be determined. In one implementation, a method may include receiving a radio signal corresponding to a multicast broadcast of content that was encoded using a forward error correction (FEC) technique in which the content is segmented and encoded as a plurality of blocks; and reassembling the content corresponding to the received radio signal. The method may further include determining an FEC failure rate based on a relative occurrence of the successfully reassembled blocks to the unsuccessfully reassembled blocks; determining a service quality metric based on the FEC failure rate; and providing a visual indication of the service quality metric.

20 Claims, 10 Drawing Sheets

SERVICE QUALITY MEASUREMENT AND INDICATION FOR MULTICAST BROADCAST IN A WIRELESS NETWORK

BACKGROUND

In an increasingly networked world, more and more traffic, such as data, voice, and video, is transmitted over public and proprietary networks. Wireless networks, in particular, are becoming increasingly popular as networks through which subscribers obtain both voice services (e.g., telephone calls) and data services (e.g., email and web surfing).

One class of mobile wireless devices, such as smart phones and tablet (e.g., "pad") computing devices, may include mobile communication devices that are designed to provide additional functionality, such as the ability to execute a variety of general purpose computing applications. When providing content, such as streaming video content, files, or other content, over a wireless network, it may be important to intelligently deliver the content to the mobile devices to limit strain on the wireless network. One known technique of delivering content is known as multicast broadcast, in which a single channel may be used to broadcast content to multiple mobile devices. In contrast, with a unicast transmission, content transmitted to multiple mobile devices may require multiple channels that are each dedicated to a single mobile device.

With unicast, the signal strength of the radio interface between the mobile device and the base station, to which the mobile device is attached, may be directly measured by the mobile device and the base station. Mobile devices may provide a visual indication (e.g., an icon that displays a number of bars) that indicates the signal strength. A user may use the visual indication to quickly determine the current quality of the radio connection of the mobile device.

DETAILED DESCRIPTION OF PREFERRED EMBODIMENTS

The following detailed description refers to the accompanying drawings. The same reference numbers in different drawings may identify the same or similar elements.

In telecommunications, information theory, and coding theory, forward error correction (FEC) is a technique used for controlling errors in data transmission over unreliable or noisy communication channels. The central idea of FEC is that a sender encodes a message in a redundant way by using an error correcting code to expand the message into a longer message. The redundancy allows the receiver to recover the original message from a subset of the expanded message. FEC thus gives the receiver the ability to correct errors without needing a reverse channel to request retransmission of data. FEC may be particularly useful in situations where retransmissions, by the sender, may be costly or impossible, such as in multicast broadcast situations.

Techniques described herein may determine a service quality metric that measures the quality of a multicast broadcast that is being received by a mobile device. The service quality metric may be visually displayed by the mobile device, such as through an icon that provides an indication of the service strength of the multicast broadcast. The service quality metric may be determined based on the failure rate of blocks that are decoded using FEC. For example, an FEC decoder, over a certain time period (e.g., four seconds), may receive data that may be reassembled into 10 blocks of data (each block may be a fixed length data unit). Of the 10 blocks, the FEC decoder may determine that nine of the blocks are recoverable using FEC techniques. One of the blocks may not be recoverable and is considered to be a failed block. In this example, the failure rate of the received blocks (10%) may be used as a basis for the service quality metric.

Figure 1:
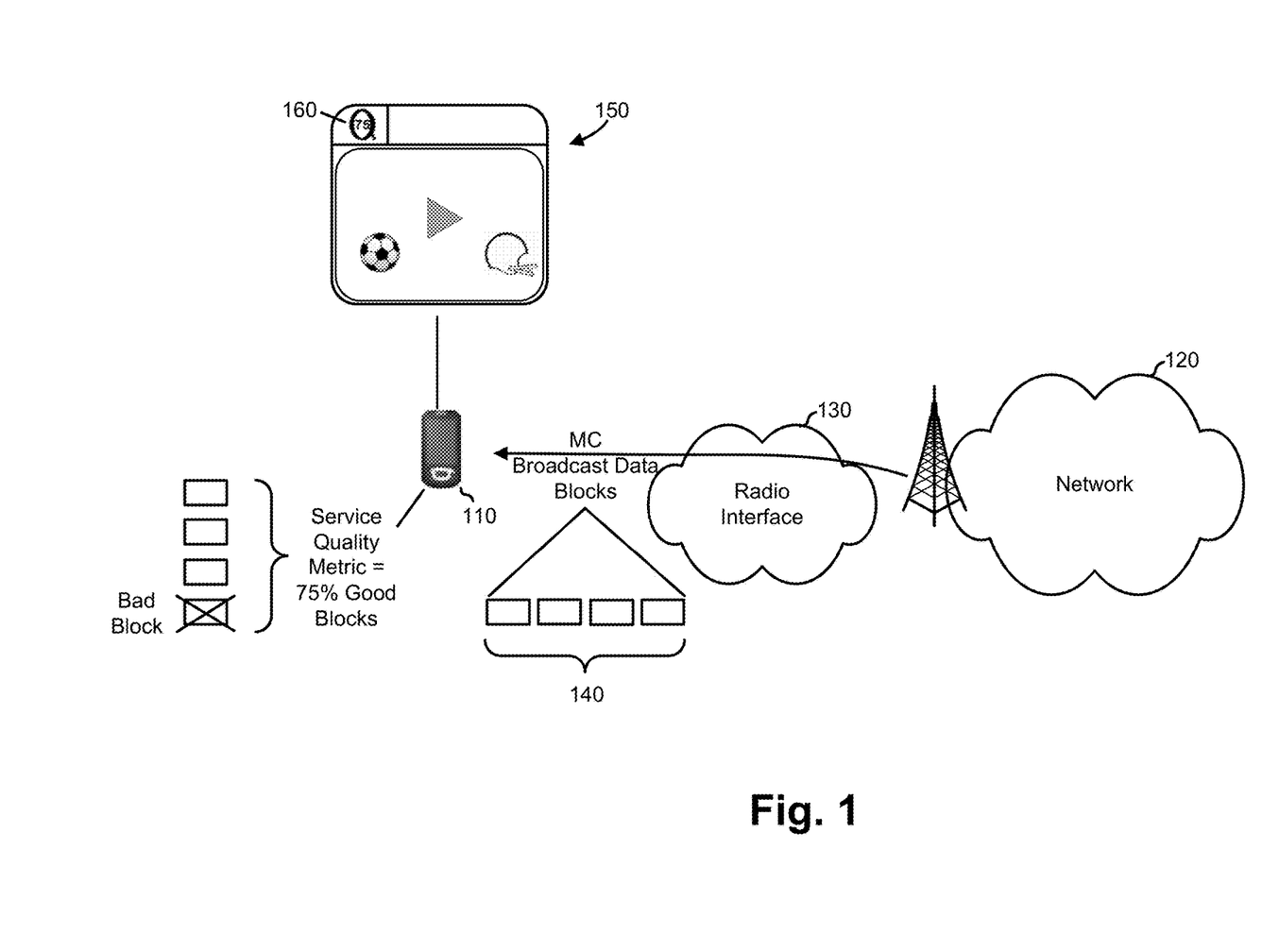
FIG. 1 is a diagram conceptually illustrating an example of an overview of concepts described herein.

FIG. 1 is a diagram conceptually illustrating an example of an overview of concepts described herein. As shown in FIG. 1, mobile device 110 may connect to network 120, which may be a wireless network (e.g., a cellular wireless network), via radio interface 130. Radio interface 130 may correspond to radio signals, transmitted over the air, between mobile device 110 and network 120.

Network 120 may provide for communications via a multicast broadcast. In a multicast broadcast, a radio signal may be simultaneously transmitted by one or more base stations associated with network 120 (e.g., over multiple cells in a cellular wireless network) to multiple mobile devices, which may receive the radio signal. In this manner, content, such as streaming video content, may be simultaneously broadcast to multiple mobile devices 110 over a single radio channel. Accordingly, multicasting content can be a relatively efficient technique for using the radio spectrum associated with radio interface 130. From the point of view of mobile device 110, an incoming multicast stream may be a one-way stream, where the mobile device may passively receive the stream but may not have an opportunity to provide feedback (e.g., to a base station and/or to network 120) relating to the quality of the stream.

In FIG. 1, assume that mobile device 110 (and potentially other mobile devices) receives a multicast broadcast ("MC Broadcast") from network 120. The multicast broadcast may use FEC to encode and decode the data of the multicast broadcast (e.g., a video steam, a file, etc.) into a number of data blocks 140. In this example, the multicast broadcast may be a video stream of sports highlights. Mobile device 110 may provide graphical interface 150, which presents the video stream, to the user of mobile device 110. Graphical interface 150 may include icon 160 that indicates the quality of the received multicast service that is associated with the multicast broadcast. In this example, icon 160 includes a graphical symbol with the number 75 inside of the graphical symbol. The number inside of the graphical symbol may be a number indicating a relative quality of the received multicast broadcast (e.g., a value in the range from zero to 100).

In some implementations, the quality of the received multicast broadcast, called the service quality metric herein, may be determined based on a failure rate relating to the FEC encoding and decoding. For example, and as illustrated, assume that of the four data blocks 140 transmitted via the multicast transmission, one of the data blocks is bad (e.g., the block cannot be reassembled using FEC techniques). Mobile device 110 may use the failure rate of the FEC blocks (e.g., as illustrated, a failure rate of one out of four, or 25%) to determine the service quality metric. In the example of FIG. 1, the service quality indication may be set to be equal to one minus the failure rate (75%). In other implementations, the service quality metric may be derived, based on the failure rate, using other techniques.

Figure 2:
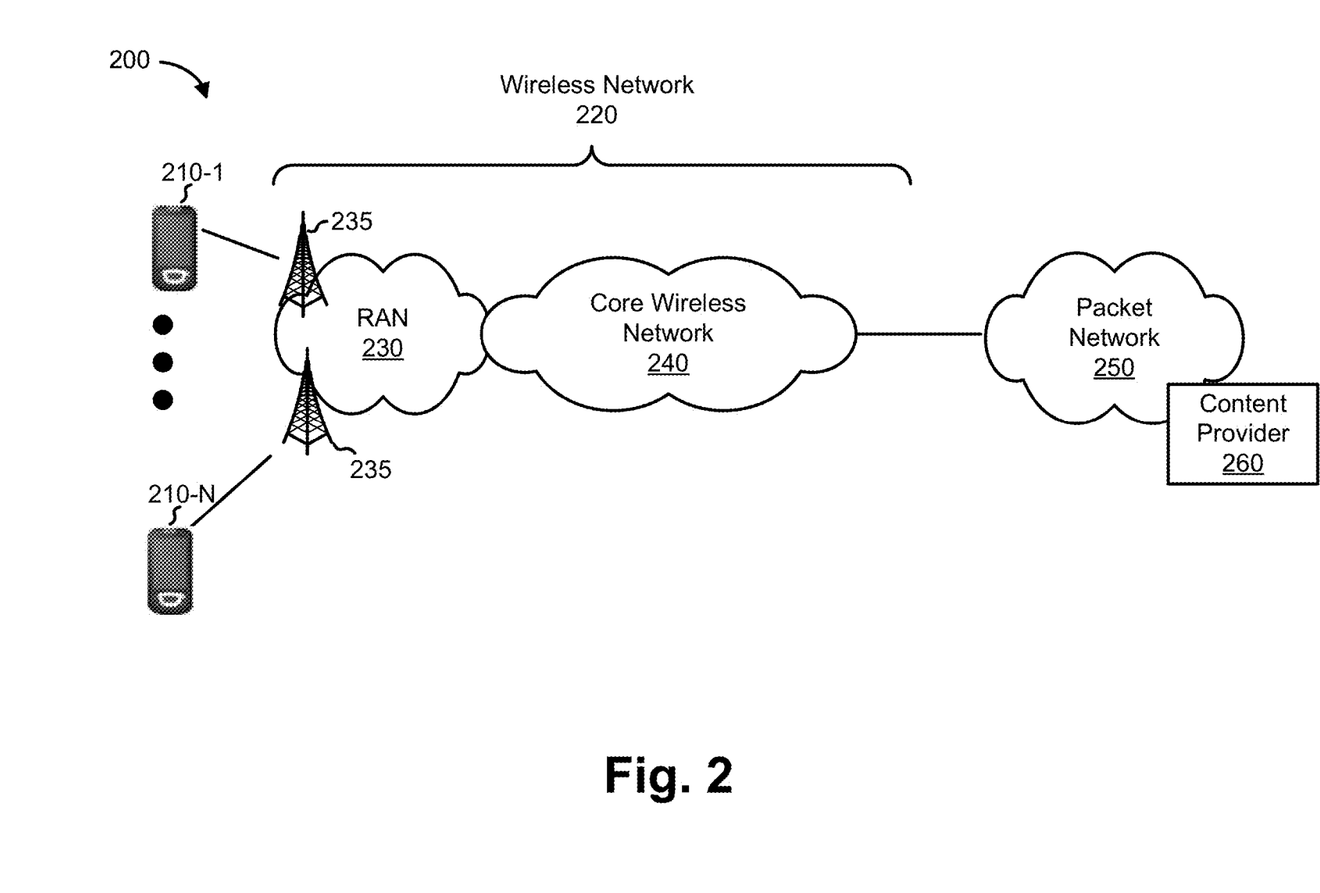
FIG. 2 is a diagram of an example environment in which systems and/or methods described herein may be implemented.

FIG. 2 is a diagram of an example environment 200 in which systems and/or methods described herein may be implemented. As illustrated, environment 200 may include one or more mobile devices 210-1 through 210-N (referred to collectively as "mobile devices 210" or singularly as "mobile device 210"). Mobile devices 210 may obtain network connectivity through wireless network 220 (e.g., a cellular network). Wireless network 220, as illustrated, may include radio access network (RAN) 230 and core wireless network 240.

One or more additional networks, such as a packet network 250, may connect to core wireless network 240. Content provider 260 may include one or more devices, such as content servers, that deliver content (e.g., streaming audio or video) to mobile devices 210. The content, from content provider 260, may be delivered, over RAN 230, as multicast content.

Mobile devices 210 may include portable computing and communication devices, such as a personal digital assistant (PDA), a smart phone, a cellular phone, a laptop computer with connectivity to a cellular wireless network, a tablet computer, etc. Mobile devices 210 may also include non-portable computing devices, such as desktop computers, consumer or business appliances, set-top devices (STDs), or other devices that have the ability to connect to RAN 230. Mobile devices 210 may connect, through a radio link, to RAN 230. Through the radio link, mobile devices 210 may obtain data and/or voice services, such as content delivery services via which content (e.g., streaming video, streaming audio, or other content) may be delivered to mobile devices 210.

RAN 230 may include one or more devices that include radio interfaces to provide wireless connections to mobile devices 210. RAN 230 may provide wireless connectivity for wireless network 220. RAN 230 may include, for example, one or more base stations 235. Each base station 235 may provide one or more radio interfaces over which the base station may communicate with mobile devices 210. The radio interfaces may include, for example, orthogonal frequency-division multiplexing (OFDM) and/or single-carrier frequency-division multiple access (SC-FDMA) based radio interfaces. In the context of a network such as a long term evolution (LTE) network, base stations 235 may be referred to as evolved Node Bs (eNodeBs).

Core wireless network 240 may implement a network that provides routing, control, and data transmission services for mobile devices 210. Core wireless network 240 may connect to one or more other networks, such as to packet network 250, to provide network services to mobile devices 210. Core wireless network 240 may include one or more network devices used to implement control logic, physical links, and routing/switching functions that may be performed by core wireless network 240. In one implementation, core wireless network 240 may implement an LTE network.

Packet network 250 may include one or more packet networks, such as an Internet Protocol (IP) based packet network. Packet network 250 may include a wide area network (WAN), a local area network (LAN), and/or combinations of WANs and LANs. Mobile devices 210 may access packet network 250 to obtain computation and/or data services from computing devices, such as from content provider 260.

Content provider 260 may include one or more server devices that provide content, such as on-demand video content, to mobile devices 210. A content provider 260 may, for example, be an entity that has the rights to provide television content, other video content, radio content, etc. Content provider 260 may provide content, destined for mobile devices 210, via packet network 250 and wireless network 220. As mentioned above, some of the content provided by content provider 260 may be multicast to multiple user devices 210.

Figure 3:
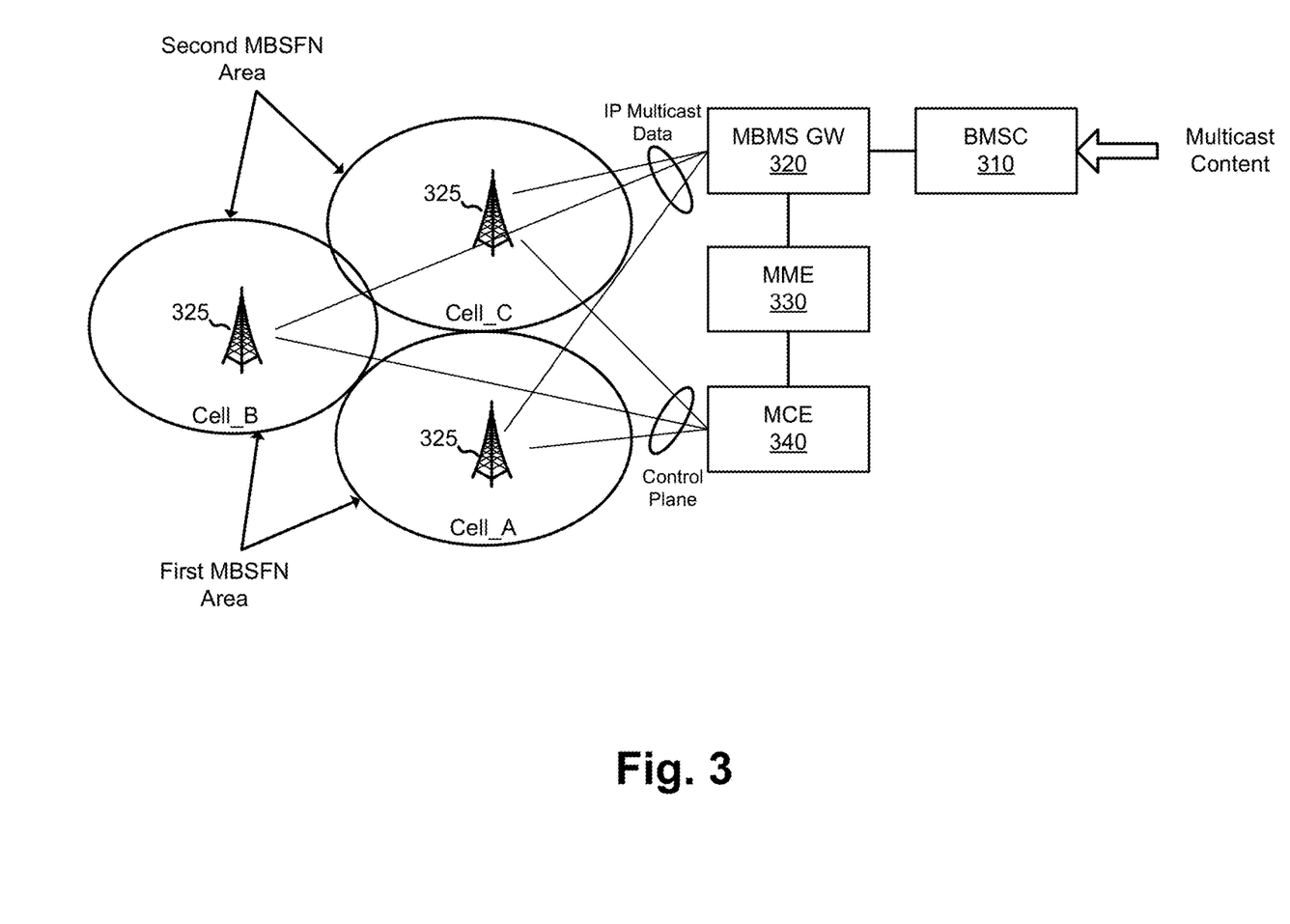
FIG. 3 is a diagram illustrating an example implementation of portions of the environment shown in FIG. 2.

FIG. 3 is a diagram illustrating an example implementation of portions of environment 200. In FIG. 3, elements of wireless network 220 may be particularly illustrated for an LTE network. In the context of an LTE network, multicast may be implemented as an enhanced Multimedia Broadcast Multicast Service (eMBMS) service. In other possible implementations, the functionality corresponding to the portions of environment 200 that are illustrated in FIG. 3 may be implemented based on other standards or technologies.

As shown in FIG. 3, an eMBMS service may be implemented using broadcast multicast service center (BMSC) 310, MBMS Gateway (MBMS GW) 320, Mobility Management Entity device (MME) 330, and Multi-cell/multicast Coordination Entity (MCE) 340. The eMBMS service may be provided to a number of wireless cells, labeled as Cell_A, Cell_B, and Cell_C. Each cell may be associated with a corresponding eNodeB 325.

BMSC 310 may include one or more computation or communication devices that provide for the coordination of multicast using eMBMS. BMSC 310 may perform functions relating to authorization, charging, and assignment of communication channels. For example, BMSC 310 may assign a particular number of multicast data channels for various multicast content streams. BMSC 310 may also receive content, such as from content provider 260. BMSC 310 may forward the received content as part of a multicast transmission.

MBMS GW 320 may include one or more computation or communication devices that provide for the coordination of the sending of multicast data (e.g., IP multicast packets) to base stations 235. MBMS GW 320 may receive the content, that is to be broadcast, from BMSC 310. As illustrated, MBMS GW 320 may transmit eMBMS data plane traffic ("IP Multicast Data") to eNodeBs 325.

MME 330 may include one or more computation and communication devices that gather, process, search, store, and/or provide information in a manner described herein. For example, MME 330 may perform operations relating to registering mobile devices 210 with the LTE network, the hand off mobile devices 210 from/to another network, and to policing operations on traffic destined for and/or received from mobile devices 210.

MCE 340 may include one or more computation or communication devices that may perform admission control, allocation of radio resources throughout a Multimedia Broadcast Multicast Service Single Frequency Network (MBSFN) area, MBMS session control signaling, and make decisions on radio configurations. As illustrated, MCE 340 may transmit eMBMS control plane traffic ("Control Plane") to eNodeBs 325.

In eMBMS, cells associated with eNodeBs 325 may be grouped to obtain MBSFN areas. Multicast data channels in a MBSFN area may be synchronized so that identical multicast radio signals may be generated, at the same time, for multiple cells. For example, MBSFN areas may be defined that cover the area associated with multiple ones of the illustrated cells. For example, a first MBSFN area may correspond to the area covered by Cell_A and Cell_B. A multicast data channel, transmitted in the first MBSFN area, may include radio signals that are synchronized in Cell_A and Cell_B. A second MBSFN area may correspond to the area covered by Cell_B and Cell_C.

Although FIGS. 2 and 3 illustrate example components of environment 200, in other implementations, environment 200 may contain fewer components, different components, differently arranged components, or additional components than those depicted. Alternatively, or additionally, one or more components of environment 200 may perform one or more other tasks described as being performed by one or more other components of environment 200.

Figure 4A:
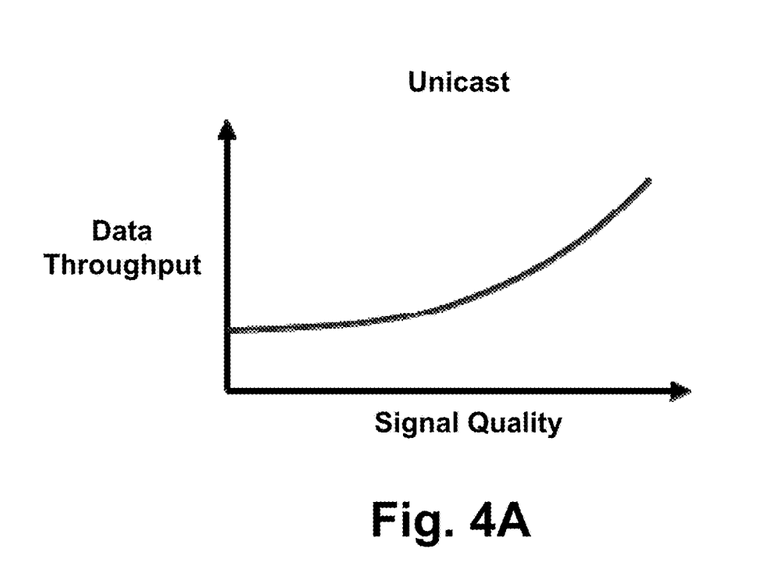
FIGS. 4A and 4B are diagrams conceptually illustrating the relationship between signal quality and data throughput for a unicast communication and a multicast broadcast.
Figure 4B:
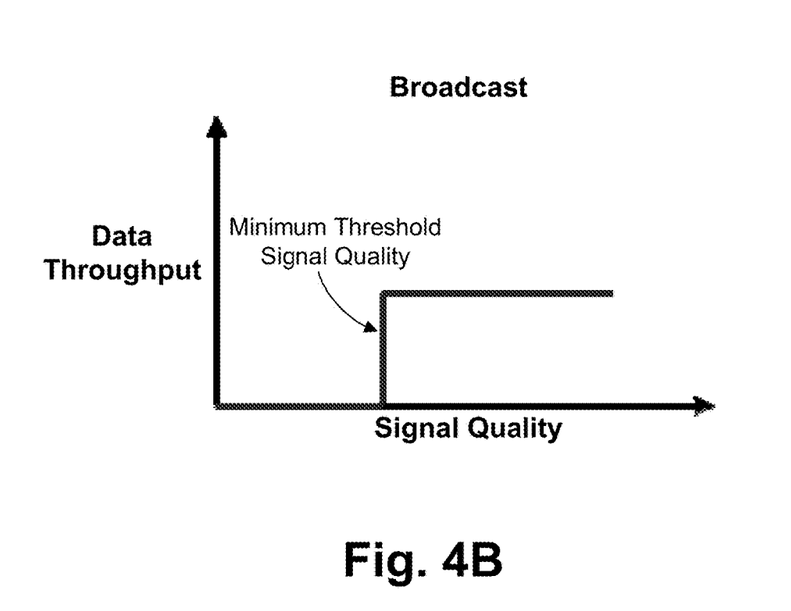

FIGS. 4A and 4B are diagrams conceptually illustrating the relationship between signal quality and data throughput for a unicast communication (FIG. 4A) and a multicast broadcast (FIG. 4B). As illustrated in FIG. 4A, the data throughput for a unicast communication may gradually and monotonically increase as the signal quality increases. The signal quality for a unicast communication, in the context of an LTE environment, may be referred to a LTE Received Signal Strength Power (RSSI) and may be calculated based on the average of the Reference Signal Broadcast Power (RSRP) and the received signal to noise ratio (SNR). In unicast, mobile device 210 may receive a communication signal from a single cell and treat signals from other cells as interference.

As illustrated in FIG. 4B, for a multicast broadcast, a minimum threshold signal quality may be necessary to receive the multicast broadcast. When the signal quality falls below the threshold, the broadcast content may no longer be receivable. As previously mentioned, for a multicast broadcast, receiving mobile devices 210 may operate in a passive receiving mode in which feedback is not provided from mobile devices 210. In contrast to a unicast transmission, for a multicast broadcast, an eNodeB 325 may transmit the data using a fixed modulation coding scheme (MCS). Error correction may be provided using FEC techniques.

Figure 5:
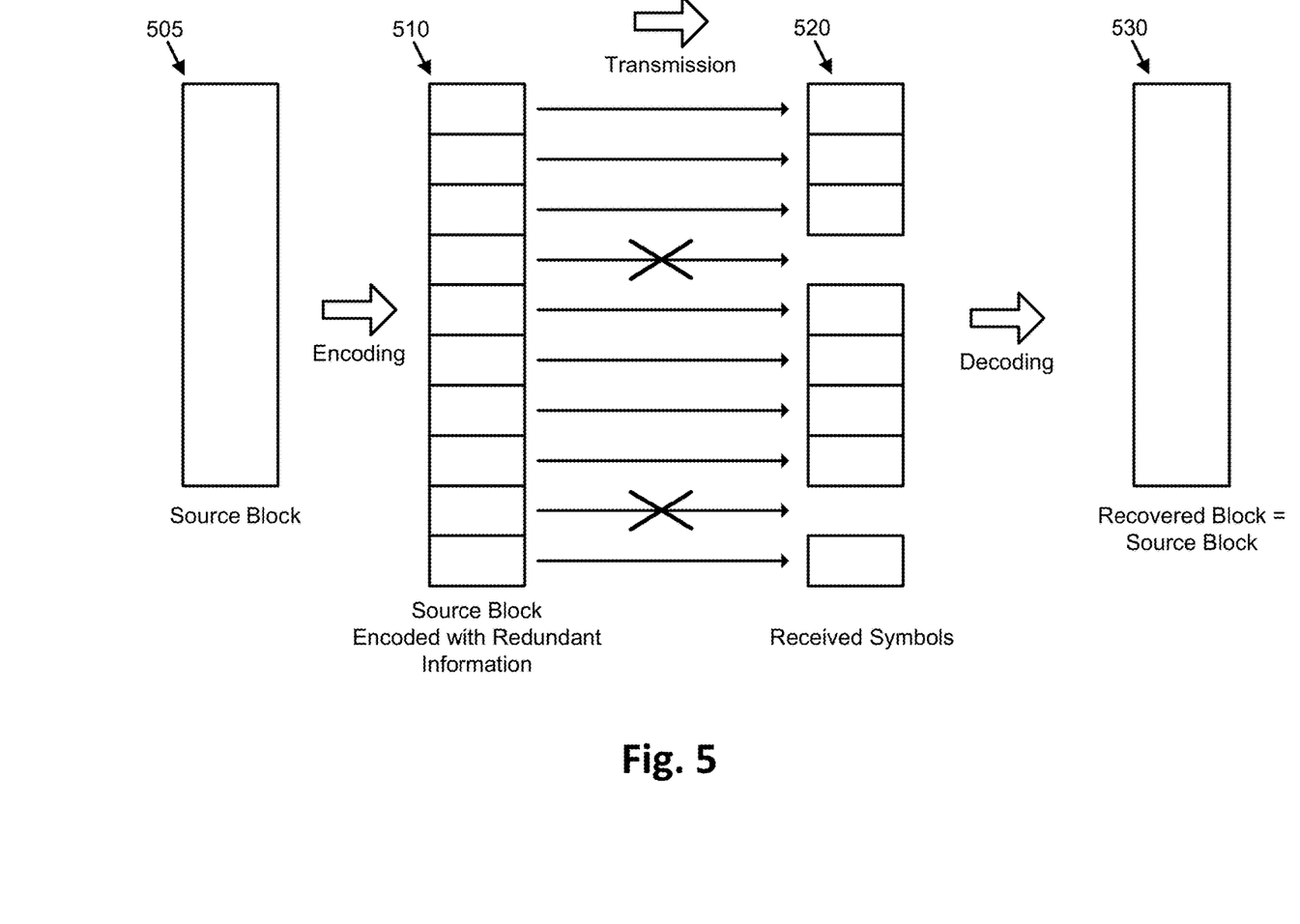
FIG. 5 is a diagram conceptually illustrating an example of forward error correction (FEC) encoding and decoding.

FIG. 5 is a diagram conceptually illustrating an example of FEC encoding and decoding. As illustrated, a file, portion of a data stream (e.g., a segment of a video stream), or other quantity of data may be divided into a number of units, called blocks herein. A block may be defined as the smallest unit of data that can be recovered with FEC. For example, a 10 kB (kilo-byte) file (or 10 kB segment of a streaming video or audio file) may be divided into 10 sequential blocks, where each block includes 1 kB of the 10 kB file. A single block 505 is illustrated in FIG. 5. It may be desired to transmit block 505 across a noisy communication channel (e.g., a wireless link).

As part of the FEC operation, block 505 may be divided into a number of smaller units of data 510, called symbols herein. Symbols 510 may be generated, pursuant to the operation of FEC, to include redundant information such that the total aggregate size of the symbols is greater than the size of block 505. The redundant information may be added such that block 505 can be reconstructed based on any combination of a certain minimum number of symbols 510. For example, block 505 may be recoverable from any 8 of the 10 symbols 510. The amount of redundancy to add when creating symbols 510 may be a configurable parameter.

Symbols 510 may be transmitted over a noisy medium (e.g., a wireless channel), in which one or more of the symbols may be lost or received with errors. In the example of FIG. 5, two of the ten transmitted signals are illustrated as being lost in transmission. Due to the FEC encoding, however, block 505 may still be recovered (illustrated as recovered block 530, which may be identical to block 505). If the FEC encoding required at least 8 of the 10 symbols to recover block 505, and another symbol had been lost during transition (i.e., only seven symbols 520 were received), block 505 may be unrecoverable.

Figure 6:
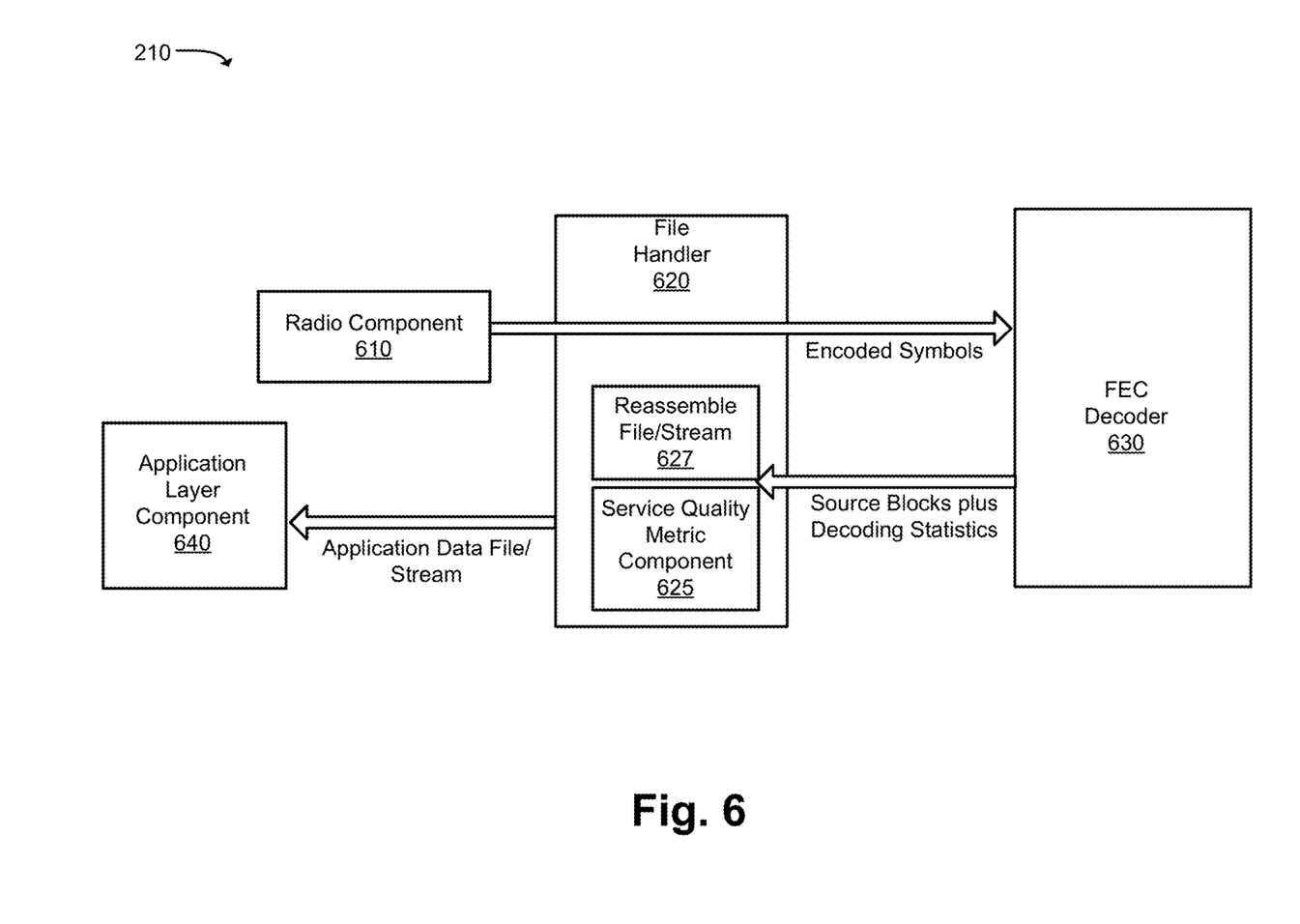
FIG. 6 is a diagram conceptually illustrating an example of components, of a mobile device, for determining a service quality metric for data received in a multicast broadcast.

FIG. 6 is a diagram conceptually illustrating an example of components, of a mobile device 210, for determining a service quality metric for data received in a multicast broadcast. As illustrated, mobile device 210 may include radio component 610, file handler 620, FEC decoder 630, and application layer component 640. Radio component 610, file handler 620, FEC decoder 630, and application layer component 640 may be implemented in hardware, software, and/or a combination of hardware and software.

Radio component 610 may include logic to manage the radio interface, such as the radio interface used to connect to wireless network 220, and to receive multicast data over the radio interface. Radio component 610 may receive the symbols for a multicast broadcast and provide the symbols to file handler 620 (or alternatively, directly provide the symbols to FEC decoder 630).

File handler 620 may provide an interface and/or control the operation of FEC decoder 630. File handler hundred 620 may forward the encoded symbols to FEC decoder 630 and receive source blocks back from FEC decoder 630. In some implementations, FEC decoder 630 may provide statistics relating to the operation of FEC decoder 630. For example, the statistics may include information relating to a number or portion of valid symbols and/or blocks, information relating to the historical performance of FEC decoder 630, information relating to the throughput or bandwidth of FEC decoder 630, and/or other information. The statistics may be provided, by FEC decoder 630, to file handler 620.

As illustrated in FIG. 6, file handler 620 may include service quality metric component 625 and reassemble file/stream component 627. Service quality metric component 625 may, based on the received source blocks and/or decoding statistics, provided from FEC decoder 630, determine the service quality metric that indicates the quality of the reception of the multicast broadcast. For video signal broadcasts, the service quality metric may be determined on a per-video stream basis. In one implementation, service quality metric may be calculated based on a ratio, calculated over a particular time period, of the number of resource blocks that are successfully received relative to the total number of resource blocks that were transmitted as part of a multicast broadcast. The operation of service quality metric component 625 determining the service quality metric will be described in more detail below.

Reassemble file/stream component 627 may receive source blocks from FEC decoder 630 and convert the source blocks into the original file or segment of an audio/video stream. Reassemble file/stream component 627 may perform, for example, buffering of the received source blocks, reordering of resource blocks that are received out of order, concatenation of received source blocks, or other operations relating to the reassembly of a file or stream.

Application layer component 640 may represent one or more applications that use the reassembled files or streams. Application layer component 640 may include, for example, a video playback application, an audio playback application, a gaming application, a productivity application (e.g., word processor, etc.), or another application that may use data that may be provided via multicast broadcast. Application layer component 640 may receive the original file or segment from file handler 620.

Figure 7:
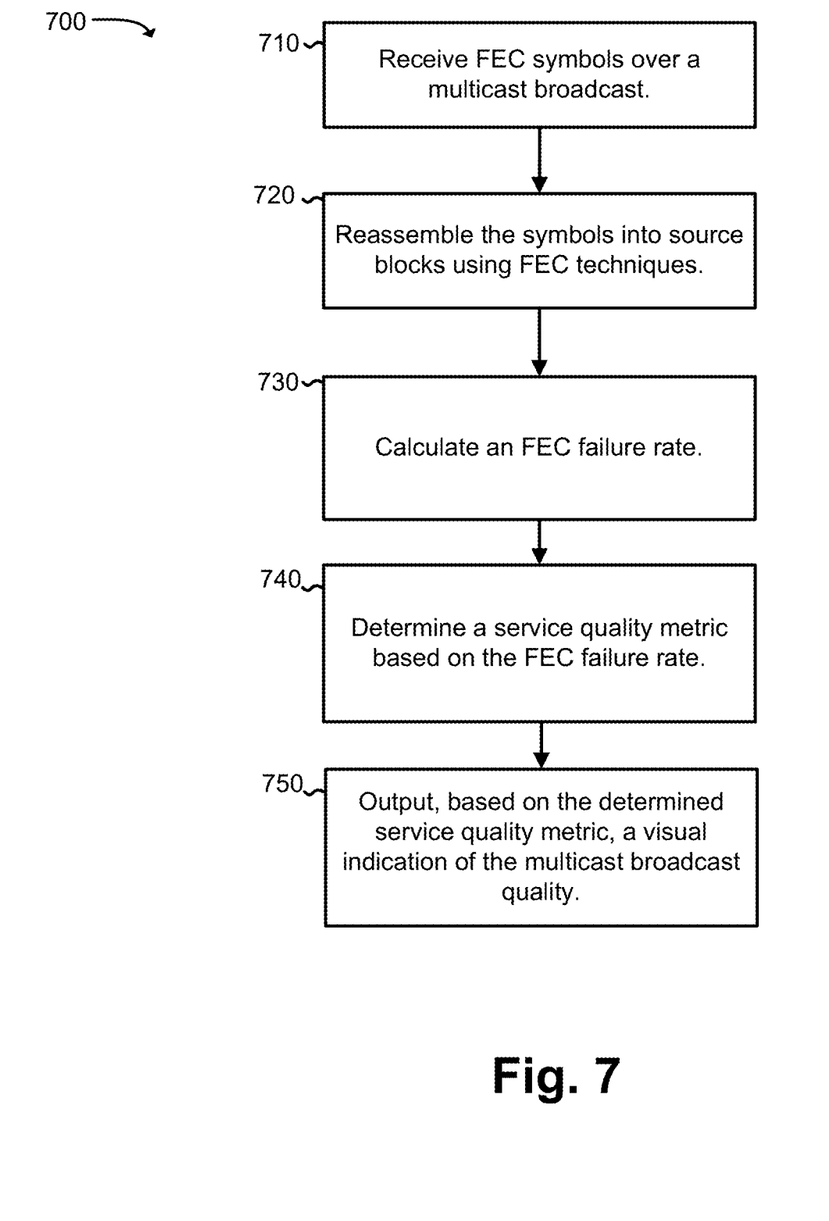
FIG. 7 is a flowchart illustrating an example process for calculating and using a service quality metric for multicast broadcasts.

FIG. 7 is a flowchart illustrating an example process 700 for determining and using a service quality metric for multicast broadcasts. Process 700 may be implemented, for example, by mobile device 210.

Process 700 may include receiving FEC symbols over a multicast broadcast (block 710). For example, the symbols may be received by FEC decoder 630 from radio component 610 or file handler 620. As previously mentioned, a transmitting device, such as a base station 235, when transmitting data, via a multicast broadcast, may segment the data into sequential blocks. Each of the blocks may be encoded using FEC encoding techniques into a number of symbols. The symbols may be provided to FEC decoder 630 for decoding and reassembly into the original block.

Process 700 may further include reassembling, using FEC techniques, the symbols into the corresponding source blocks (block 720). In one implementation, FEC decoder 630 may operate to manage the encoded symbols, and may decode the symbols to generate a block whenever enough symbols are received to enable generation of the block. As previously mentioned, with FEC, the minimum number of symbols needed to be received to generate a block may be determined during the decoding process and may be based on one or more parameters relating to the total number of symbols desired (per block) and the amount of redundancy desired. For example, a block may be divided into 20 symbols, in which any 15 of the symbols may be needed to generate the block. In general, selecting the amount of redundancy and number of symbols for a block may be based on the desire to balance error correction of symbols that are lost or corrupted in transmission versus the tradeoff of a larger amount of data to process and transmit.

For some blocks, FEC decoder 630 may not receive enough symbols to reassemble the block. For example, for a block that is divided into ten symbols and requires eight symbols to reassemble, if three or more symbols are lost in transmission, reassembly of the block will not be possible. In this example, FEC decoder 630 may determine that the block cannot be reassembled when a total of three corrupted symbols are received and/or when a timeout threshold period has elapsed without reception of the required eight symbols. In this case, the block may determined to be an FEC failure.

Process 700 may further include calculating the FEC failure rate based on the number of failed blocks relative to the number of good blocks (e.g., blocks that can be reassembled) (block 730). The FEC failure rate may be calculated over a particular time period (e.g., the last four seconds), a particular number of blocks (e.g., over the last 100 received blocks), or based on other techniques that calculate the FEC failure rate.

As an example of the calculation of the FEC failure rate, consider a non-streaming case, such as the transmission of a file that is divided into two blocks. If decoding of one of the blocks fails, the failure rate may be calculated as ½, or 50%. As another example of the calculation of the FEC failure rate, consider a streaming case in which the FEC failure rate is calculated every four blocks. If decoding of one of the blocks fails, the failure rate may be calculated as ¼, or 25%.

In some implementations, FEC decoder 630 may provide good (i.e., correctly reassembled blocks) blocks to reassemble file stream component 627 of file handler 620, and may not output anything for error blocks. In this implementation, the FEC failure rate may be determined, by service quality metric component 625, by identifying a block to be failed based on the absence of the reception of the block from FEC decoder 630. For example, each block may include control information that indicates a sequence number of the block relative to the file or stream from which the block was extracted. Service quality metric component 625 may determine a particular block, to be a failed block, when successive blocks from FEC decoder 630 skip a sequence number.

In some implementations, instead of calculating the FEC failure rate based on the number of failed blocks, other metrics could alternatively or additionally be used to calculate the FEC failure rate. For example, the number or ratio of bad symbols (e.g., symbols that are corrupted or lost in transmission) may be used instead of the number of bad blocks.

Process 700 may further include calculating the service quality metric based on the FEC failure rate (block 740). For example, service quality metric component 625 may calculate the service quality metric as the FEC failure rate (e.g., a percent value) over a particular time period, or over a particular number of previously received blocks, and converted to a service quality metric by a transformation function. For example, the service quality metric may be defined as one minus the FEC failure rate. Thus, if the FEC failure rate is 20%, the service quality metric may be calculated as 80%.

As another example, a threshold operation may be applied to convert the FEC failure rate into a binary value (e.g., represent "good" multicast broadcast quality or "bad" multicast broadcast quality). For instance, the binary value may be changed from good to bad (or vice-versa) when the FEC failure rate is greater than a threshold value for a defined time period. Otherwise, the binary value will remain unchanged. As a specific example, the threshold value may be set at 5% and the time period may be set at eight seconds. In this example, when one out of eight blocks fail during the eight second period (FEC failure rate=⅛=12.5%), then the binary value may be set to "bad".

As another example, the FEC failure rate may be converted into a quantized value, such as a value on the integer scale of zero ("bad" multicast broadcast quality) to five ("excellent" multicast broadcast quality). Additional examples relating to the calculation of the service quality metric, based on the FEC failure rate, are described in more detail below.

Process 700 may further include outputting, based on the determined service quality metric, a visual indication of the quality of the multicast broadcast that is being received by the mobile device (block 750). For example, the service quality metric may be provided to one or more applications in application layer component 640, which may display a graphical icon, associated with the application program, representing the value of the service quality metric. Alternatively or additionally, the service quality metric may be provided to an operating system layer of mobile device 210, which may display a graphical icon, such as in operating system level notification area, representing the value of the service quality metric. In other possible implementations, the service quality metric may be used for other purposes, such as being used by an application, executed by mobile device 210, as part of the operation of the application.

Figure 8A:
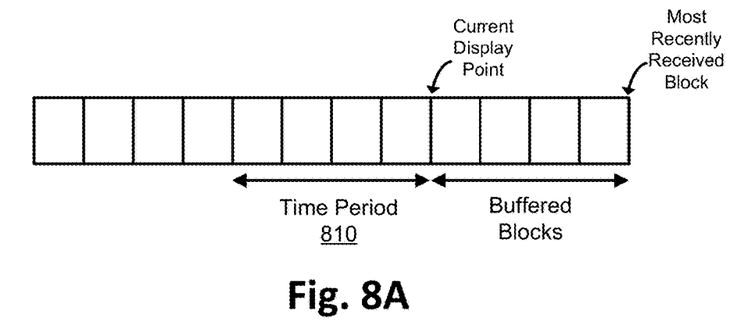
FIGS. 8A, 8B, and 8C illustrate calculation of an FEC failure rate over different time periods.
Figure 8B:
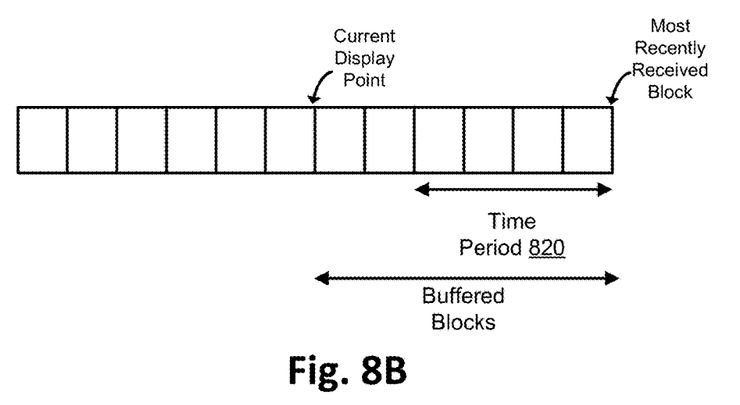
Figure 8C:
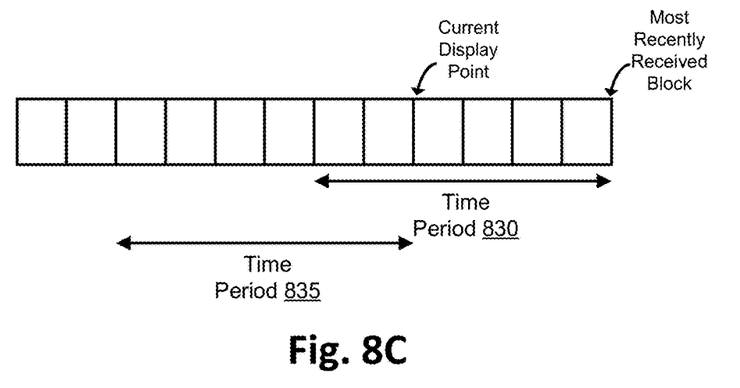

As mentioned above with respect to the description of block 730, the FEC failure rate may be calculated over a particular time period. FIGS. 8A-8C illustrate calculation of the FEC failure rate over different time periods with respect to the current position of an incoming transmission stream (e.g., a video stream). In each of FIGS. 8A-8C, a time series of source blocks, received by mobile device 210, is illustrated. In each of FIGS. 8A-8C, the most recently received block is illustrated on the right side of the figure.

As illustrated in FIG. 8A, the FEC failure rate may be calculated based on the blocks (either successfully received or failure blocks) corresponding to a time period 810. Time period 810 may include blocks received in a particular time period (e.g., four seconds) that begins at the current display point (for a video stream). In implementations in which blocks are periodically transmitted, time period 810 may equivalently correspond to a particular number of blocks (e.g., when a block is transmitted every second, a four second time period may correspond to four blocks). Blocks that have been received but not yet presented in the video stream may correspond to buffered blocks, such as blocks stored by file handler 620 but not yet provided to application layer component 640.

In the implementation illustrated in FIG. 8B, the FEC failure rate may be calculated based on the blocks (either successfully received or failure blocks) corresponding to a time period 820. Time period 820 may include blocks received in a particular time period (e.g., four seconds) that begins at the most recently received block.

In the implementation illustrated in FIG. 8C, a first FEC failure rate may be calculated based on the blocks (either successfully received or failure blocks) corresponding to a time period 830. A second FEC failure rate may be calculated based on the blocks corresponding to time period 835. Successive time periods 830 and 835 may partially overlap one another. For example, time period 830 may be six seconds and a two second overlap may be used with time period 835, which may also be six seconds. Accordingly, the FEC failure rate may be calculated every four seconds.

In the description above, the service quality metric was generally described as being based on an FEC failure rate calculated over a single time period. Alternatively or additionally, the service quality metric may be determined based on a multiple FEC failure rate measurements. For example, the most recent FEC failure rate may be combined with one or more previously calculated FEC failure rates, to obtain a combined FEC failure rate. A number of techniques may potentially be used to combine the FEC failure rates, such as via a moving average technique, a weighted moving average technique, an exponential moving average technique, etc.

A mobile device may occasionally encounter a situation, such as when the mobile device is at the boundary of service coverage, in which a multicast broadcast service is essentially down. In some implementations, mobile device 210 may detect a service down situation and provide a notification, such as a "temporary service down" notification, to the user. The service down notification may apprise the user of the current situation and may help the user avoid wasting time in frequently checking the service quality metric. In one implementation, mobile device 210 may identify a service down situation using a pair of parameters. The pair of parameters may include a service-down threshold and a hysteresis time value. The hysteresis time value may be greater than the time period over which the FEC failure rate is determined. As an example, the service-down threshold may be set at 80%, the hysteresis time value may be set to 20 seconds, and the FEC failure rate may be calculated every four seconds. If the FEC failure rate remains above 80% over the 20 second duration of the hysteresis time value, the service-down notification may be triggered.

Figure 9A:
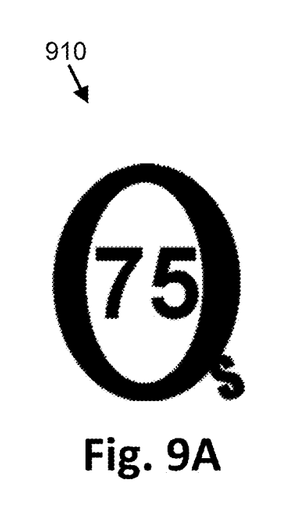
FIGS. 9A, 9B, and 9C are diagrams illustrating examples of icons that visually indicate the service quality metric.
Figure 9B:
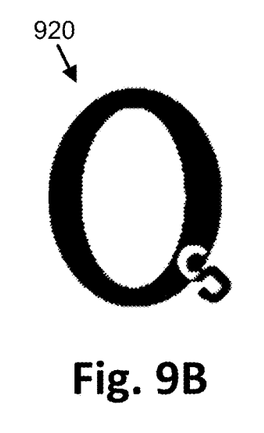
Figure 9C:
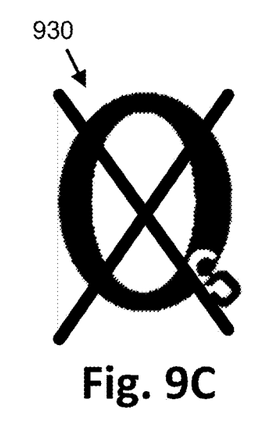

FIGS. 9A-9C are diagrams illustrating examples of icons, such as icons that may be presented in a user interface provided by mobile device 210, to visually indicate the service quality metric. In one implementation, the icons of FIGS. 9A and 9B may be presented in an operating system level notification area (e.g., a graphical area at the top portion of a display of mobile device 210). Alternatively or additionally, the icons of FIGS. 9A and 9B may be presented by application programs. For example, an application program (e.g., a video playback program) may request the current value of the service quality metric from application layer component 640. The application program may then display the icon of FIG. 9A or 9B within a graphical interface provided by the application program.

As illustrated in FIG. 9A, icon 910 may include a graphical representation that includes a number, such as an integer value between zero and 100. The integer value may represent the service quality metric, such as a value of the service quality metric calculated as one minus the FEC failure rate. In the example of FIG. 9A, service quality metric is illustrated as indicating service quality of 75%.

As illustrated in FIG. 9B, icon 920 may include a graphical representation that illustrates, in a binary manner, whether the multicast broadcast service is available or down. In one implementation, icon 920 may be assigned different colors (e.g., green for good service or red for poor service) or may be distinguished in other ways (e.g., an "X" may placed over icon 920 to indicate that the multicast broadcast service has poor service), to indicate whether a multicast broadcast service provides good or poor service. FIG. 9C illustrates an example icon 930 that illustrates an example of a binary representation in which the multicast broadcast service provides poor service.

Figure 10:
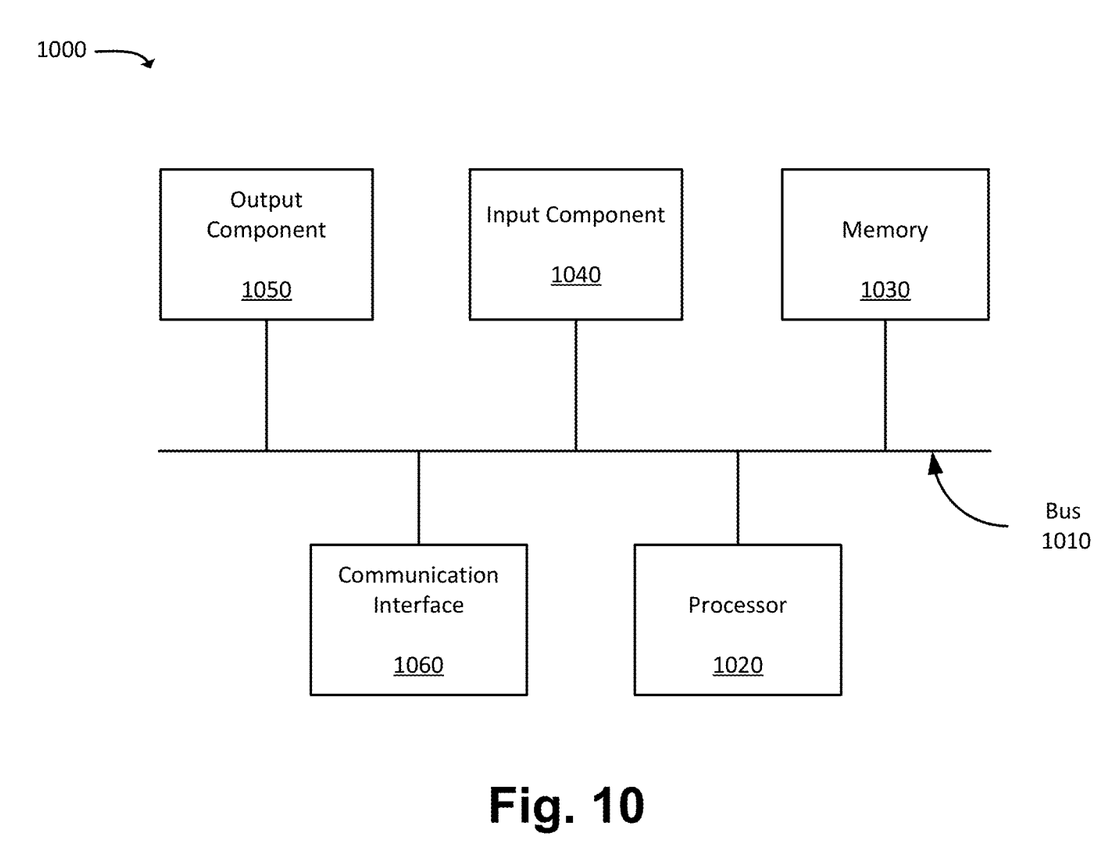
FIG. 10 is a diagram of example components of a device.

FIG. 10 is a diagram of example components of a device 1000. Each of the devices described above (e.g., devices illustrated in FIGS. 1-3 and 6) may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes (LEDs), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks has been described with regard to FIG. 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
   receiving, by a mobile device, a radio signal corresponding to a multicast broadcast of video content that was encoded using a forward error correction (FEC) technique in which the content is segmented and encoded as a plurality of blocks;
   attempting to reassemble, by the mobile device, the video content corresponding to the received radio signal, the reassembling including, for each block of the plurality of the blocks:
   successfully reassembling the block, or
   unsuccessfully reassembling the block;
   calculating, by the mobile device, an FEC failure rate based on a relative occurrence of the successfully reassembled blocks to the unsuccessfully reassembled blocks in a time series, corresponding to a portion of the video content, of the successfully reassembled and the unsuccessfully reassembled blocks, the FEC failure rate being calculated based on partially overlapping predetermined time periods or number of blocks in the time series, wherein a period at which the FEC failure rate is calculated is based on a length of the predetermined time period or number of blocks relative to a length of the overlap between the predetermined time period or number of blocks;
   determining, by the mobile device, a service quality metric based on the FEC failure rate; and
   providing, by the mobile device, a visual indication of the service quality metric.

2. The method of claim 1, wherein calculating the service quality metric further includes:
   determining the service quality metric, as a binary value, based on a comparison of the FEC failure rate to a threshold FEC failure rate.

3. The method of claim 1, wherein calculating the service quality metric further includes:
   determining the FEC failure rate as a ratio of a number of the unsuccessfully reassembled blocks to a total number of successfully and unsuccessfully reassembled blocks; and
   calculating the service quality metric as one minus the FEC failure rate.

4. The method of claim 1, wherein the service quality metric is determined for each of a plurality of video signals that are received as part of the video content.

5. The method of claim 1, wherein the FEC failure rate is determined based on an occurrence of a particular number of blocks that are successfully or unsuccessfully reassembled.

6. The method of claim 1, wherein the service metric is recalculated for each of a plurality of the overlapping predetermined time periods or number of blocks.

7. The method of claim 1, wherein the service quality metric is determined on a per-video stream basis.

8. The method of claim 1, wherein attempting to reassemble the content further includes, for each block of the plurality of blocks:
   determining whether a minimum number of symbols, required to reassemble the block, have been received, where a total number of symbols corresponding to each of the blocks of the plurality of blocks is greater than the minimum number of symbols; and
   reassembling the block based on at least the minimum number of symbols.

9. The method of claim 1, wherein the service quality metric is determined as a moving average, weighted moving average, or exponential moving average based on a plurality of previous determinations of the FEC failure rate.

10. A mobile device comprising:
a memory; and
at least one processor to execute instructions in the memory to:
receive a radio signal corresponding to a multicast broadcast of video content that was encoded using a forward error correction (FEC) technique in which the video content is segmented and encoded as a plurality of blocks;
attempt to reassemble the video content corresponding to the received radio signal, the reassembling including, for each block of the plurality of the blocks:
successfully reassembling the block, or
unsuccessfully reassembling the block;
calculate an FEC failure rate based on a relative occurrence of the successfully reassembled blocks to the unsuccessfully reassembled blocks in a time series, corresponding to a portion of the video content, of the successfully reassembled and the unsuccessfully reassembled blocks, the FEC failure rate being calculated based on partially overlapping predetermined time period or number of blocks in the time series, wherein a period at which the FEC failure rate is calculated is based on a length of the predetermined time period or number of blocks relative to a length of the overlap between the predetermined time period or number of blocks;
determine a service quality metric based on the FEC failure rate; and
provide a visual indication of the service quality metric.

11. The mobile device of claim 10, wherein, when calculating the service quality metric, the at least one processor is to further execute the instructions in the memory to:
determine the service quality metric, as a binary value, based on a comparison of the FEC failure rate to a threshold.

12. The mobile device of claim 10, wherein, when calculating the service quality metric, the at least one processor is to further execute the instructions in the memory to:
determine the FEC failure rate as a ratio of a number of the unsuccessfully reassembled blocks to a total number of successfully and unsuccessfully reassembled blocks; and
calculate the service quality metric as one minus the FEC failure rate.

13. The mobile device of claim 10, wherein the FEC failure rate is recalculated for each of a plurality of the overlapping predetermined time period or number of blocks.

14. The mobile device of claim 10, wherein, when attempting to reassemble the content, the at least one processor is to further execute the instructions in the memory to, for each block of the plurality of blocks:

determine whether a minimum number of symbols, required to reassemble the block, have been received, where a total number of symbols corresponding to each of the blocks of the plurality of blocks is greater than the minimum number of symbols; and
reassemble the block based on at least the minimum number of symbols.

15. The mobile device of claim 10, wherein the service quality metric is determined as a moving average, weighted moving average, or exponential moving average based on a plurality of previous determinations of the FEC failure rate.

16. A method comprising:
receiving, by a mobile device, a radio signal corresponding to a multicast broadcast of content that was encoded using a forward error correction (FEC) technique in which the content is segmented and encoded as a plurality of blocks, where each of the plurality of blocks are encoded as a plurality of FEC symbols;
reassembling, by the mobile device, a block, of the plurality of blocks, based on a minimum number of symbols corresponding to the block being received, where a total number of symbols corresponding to the block is greater than the minimum number of symbols;
calculating, by the mobile device, an FEC failure rate based on a portion of the blocks, in a time series of the plurality of blocks, that are not able to be reassembled, the FEC failure rate being calculated based on a partially overlapping predetermined time periods or number of blocks, wherein a period at which the FEC failure rate is calculated is based on a length of the predetermined time period or number of blocks relative to a length of the overlap between the predetermined time period or number of blocks;
determining, by the mobile device, a service quality metric based on the FEC failure rate; and
providing, by the mobile device, a visual indication of the service quality metric.

17. The method of claim 16, wherein a particular block, of the plurality of blocks, that is not able to be reassembled, is due to fewer than the minimum number of symbols being successfully received for the particular block.

18. The method of claim 16, wherein determining the service quality metric further includes:
determining the service quality metric, as a binary value, based on a comparison of the FEC failure rate to a threshold.

19. The method of claim 16, wherein determining the service quality metric further includes:
calculating the service quality metric as one minus the FEC failure rate.

20. The method of claim 16, wherein the multicast broadcast includes an Multimedia Broadcast Multicast Service (eMBMS) service.

* * * * *